Sept. 8, 1931.  W. N. OSBURN  1,821,945
MOTOR VEHICLE STEERING GEAR
Filed June 8, 1925 2 Sheets-Sheet 2
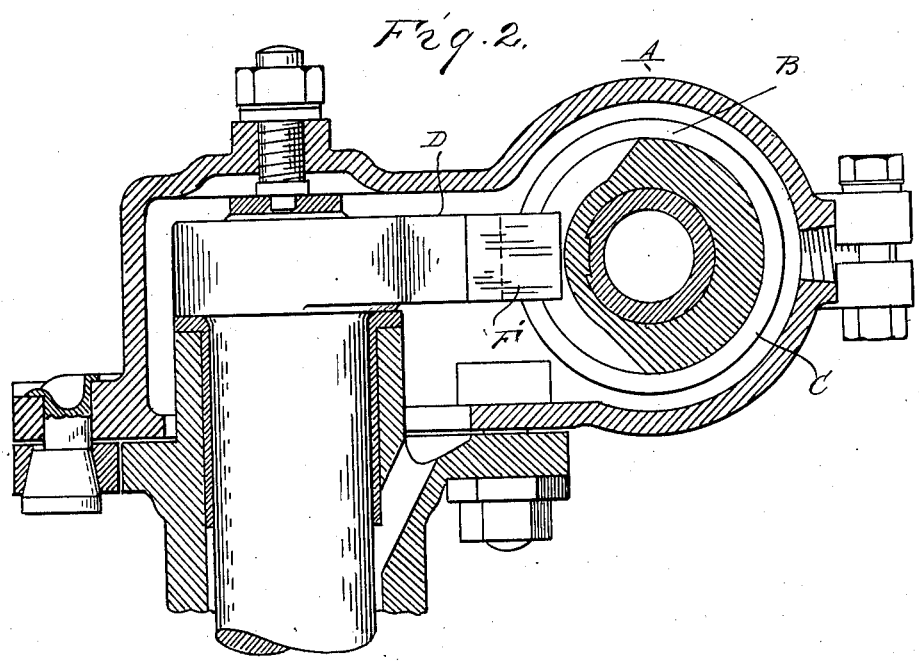
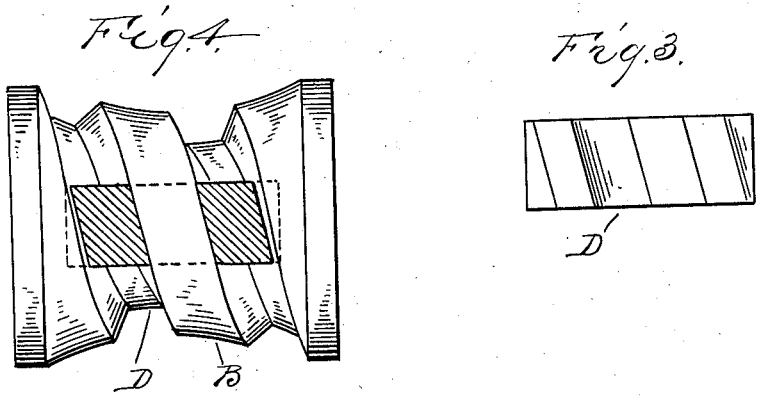
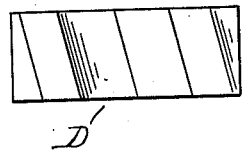
Inventor
Wallace N. Osburn
By Whittemore Hulbert Whittemore
& Belknap Attorneys Patented Sept. 8, 1931

1,821,945

UNITED STATES PATENT OFFICE

WALLACE N. OSBURN, OF DETROIT, MICHIGAN, ASSIGNOR TO GEMMER MANUFACTURING COMPANY, A CORPORATION OF MICHIGAN (1925)

MOTOR VEHICLE STEERING GEAR

Application filed June 8, 1925. Serial No. 35,797.

The invention relates to steering gears and more particularly to the construction of gearing between the rotary steering stem and the rock shaft actuated thereby.

The object of the invention is to obtain a construction particularly applicable to high ratio semi-reversible steering gears although the construction may also be used with low ratio gears.

It is a further object to simplify the construction and to reduce the size of the same without objectionable increase in unit pressure upon the working surfaces of the gears.

Still further, it is an object to obtain a construction which may be easily manufactured at a reduced cost.

With this and other objects in view the invention consists in a construction as hereinafter set forth.

In the drawings:

Figure 2 is a horizontal section therethrough in the plane of the rock shaft.

Figure 3 is a plan view of the worm gear.

Figure 4 is a section on line 4—4 of Figure 1 illustrating the worm and gear in intermeshing relation.

Figure 1:
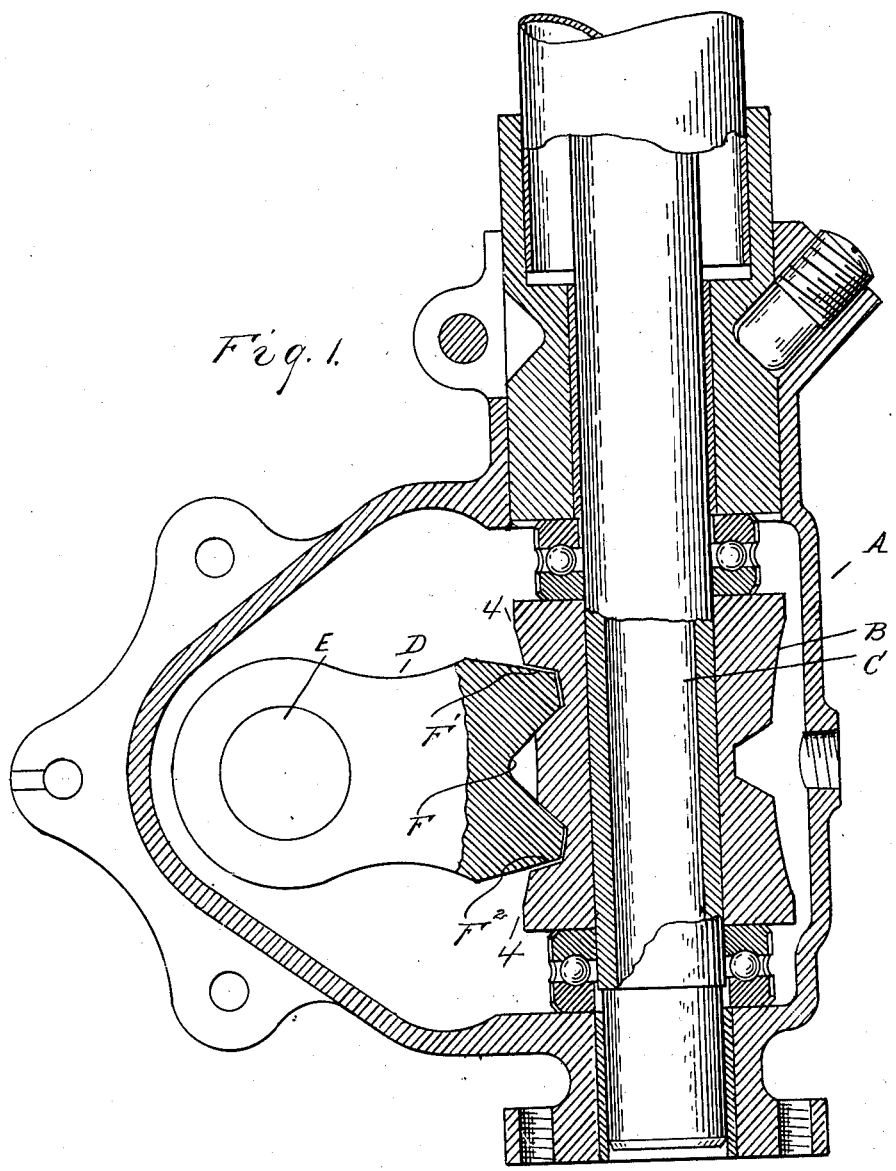
Figure 1 is a longitudinal section through a steering gear of my improved construction.

In the present state of the art it is usual in steering gears to transmit rotary movement of the steering stem to the rock shaft through the medium of an intermeshing worm and segment gear. To make the gear semi-reversible the helical angle of the worm must be properly selected to be but slightly outside the angle of friction and this, where a cylindrical worm is used, limits the number of teeth that may be simultaneously in mesh. Furthermore, with high ratio gears it is necessary that the worm should be capable of revolving through more than one revolution to impart the required angular movement to the rock shaft. In view of these conditions I have designed a construction in which the power is normally transmitted through the engagement of a male thread on the worm with a single grooved tooth on the worm gear having a line contact therewith. The worm is of a shape such as would be generated by said grooved tooth swinging about its normal axis and is preferably slightly of the Hindley type of hour-glass form. However, to secure the necessary angular movement of the gear without unduly increasing the dimensions of the worm, the opposite extremes of said movement are produced by male teeth on the gear alternatively in engagement with the grooves in the worm. Thus, the normal operation of the steering gear which is through a limited angle of movement will be effected solely through the single notched tooth, clearance being provided to avoid other contacts but when the gear is moved to extreme positions, contact is shifted to its external faces to provide the required additional movement.

Viewed in another way, the gear may be regarded as having two teeth which are alternatively in engagement but these are not developed teeth and do not exactly trace the same path of movement.

In detail A is the housing for enclosing the worm B mounted on the rotary steering stem C and the worm gear D mounted on the rock shaft E. The worm B is preferably of a length less than the full arc of movement of the worm gear thereby decreasing the size of the housing which would otherwise be required. The gear D is provided with a V-shaped notch F having flat opposite faces at the desired pressure angles and also at an angle to the plane of rotation corresponding to the desired lead or helical angle of the thread of the worm. The worm B is such as might be generated by the notched gear during the rotation of said gear and worm about their respective axes at uniform velocity. Thus there will be a line contact between the flat face of the gear and the face of the worm in each position of adjustment thereby limiting the unit pressure.

To simplify the manufacture of the gear D the external surfaces F' and F² of the single notched tooth are formed simultaneously with the opposite faces of the notch. This may be accomplished by the operation of a single milling cutter moving through a rectilinear path transverse to the plane of the gear but nonparallel to the axis of the rock shaft. The external faces F' and F² are made to clear the face of the thread of the worm when the sides of V-shaped notch F are in contact with the worm thread. This results in the actuation of the gear by a single contact during the normal operation, the external surfaces F' and F² coming into action only during the extreme movement and where a limited amount of back-lash is not objectionable. It also permits of adjustment to compensate for wear which is greatest in the central portion of the movement without producing a binding action at the extremes of the movement. Still another advantage is that as the gear moves towards its extreme position the external faces F' and F² automatically take up the clearance due to the slight difference in angle from that of a developed tooth face and thus a considerable clearance may be provided between the said outer face and the opposed worm faces in the central position of the gear.

The construction as above described may be used in any suitable construction of steering gear mechanism and in connection with cooperating parts which however, will not be described in detail.

What I claim as my invention is:

1. In a steering gear, the combination with a rotary steering stem and a rock shaft to be actuated thereby, of a gear mounted on said rock shaft having a single notched tooth, a worm on said stem having a male thread engaging said tooth, and such as would be generated by the simultaneous rotation of said worm and gear about their respective axes, said gear having portions on opposite sides of the notch which are in engagement with the grooves of said worm after disengagement of the male thread from said notch.

2. In a steering gear, the combination with a rotary steering stem and a rock shaft to be actuated thereby, of a gear mounted on said rock shaft having a tooth with a V-shaped notch therein, a worm mounted on said stem having a male thread engaging said V-shaped notch and such as would be generated by the latter during the simultaneous rotation of said gear and worm about their respective axes, said gear having portions on opposite sides of said notch normally out of contact with said worm but alternatively coming into contact therewith at the opposite end portions of angular movement of said rock shaft.

3. In a steering gear, the combination with a rotary steering stem and a rock shaft to be actuated thereby, of a gear mounted on said rock shaft having a notched tooth, a worm mounted on said stem having a male thread in engagement with the notch of said tooth and such as would be generated by the latter during the simultaneous rotation of said gear and worm about their respective axes, said worm being limited in length to less than the full arc of movement of said gear and said gear having portions on opposite sides of said notch normally out of contact with the worm for engaging and maintaining engagement with the same when said notched faces pass beyond engagement.

4. In a steering gear, the combination with a rotary steering stem and a rock shaft to be actuated thereby, of a worm and a gear respectively mounted on said stem and rock shaft having a single loaded tooth engagement for a limited angular movement on opposite sides of the central position, and an alternative tooth on said gear for maintaining engagement beyond the limits of said central movement.

5. In a steering gear, the combination with a rotary steering stem and a rock shaft to be actuated thereby, of a gear having a single notched tooth forming a pair of projecting teeth on opposite sides of the notch and a worm on said stem having a male thread such as would be generated by said notched tooth upon the rotation of said gear and worm about their respective axes, the outer faces of said projecting teeth engaging said worm only alternatively and in the outer portions of the angular movement of said rock shaft.

6. In a steering gear, a worm gear having a single transversely extending notch bounded by a pair of projecting teeth, all the surfaces of which may be simultaneously formed by a transverse rectilinear movement of a forming tool, and a worm such as might be generated by the opposed surfaces of said notch upon the simultaneous rotation of said gear and worm about their respective axes, the outer faces of said pair of teeth engaging the faces of said worm only alternatively and during the movement of said gear beyond the arc of engagement of said notched surfaces.

7. In a steering gear, a worm gear segment, having a single transversely extending notch bounded by a pair of projecting teeth all of the surfaces of which may be simultaneously formed by a transverse rectilinear movement, of a forming tool progressively fed inward into the work and a worm such as might be generated by the opposed surfaces of said notch upon the simultaneous rotation of said gear and worm about their respective axes.

8. In a steering gear, a worm gear segment having a single transversely extending notch bounded by a pair of projecting teeth all of the surfaces of which may be simultaneously formed by a transverse rectilinear movement, of a forming tool progressively fed into the work and a worm such as might be generated by the opposed surfaces of said notch upon the simultaneous rotation of said gear and worm about their respective axes, the outer faces of said pair of teeth being out of engagement with the adjacent faces of the worm in the central position of said gear segment and coming into contact with said faces of the worm alternately when the gear is on one side or the other of its central position.

9. In a steering gear the combination with a rotary steering stem and a rock shaft to be actuated thereby, of a gear mounted on said rock shaft having a notched tooth, a worm mounted on said stem having the male thread in engagement with the notch of said tooth and such as would be generated by the latter during the simultaneous rotation of said gear and worm about their respective axes, said worm being limited in length to less than the full arc of movement of said gear and the diameter of the outer portions of said worm being also less than twice the radial distance from the axis of the worm to the ends of the arc of movement of the gear, said gear having portions on opposite sides of said notch normally out of contact with the worm for engaging and maintaining engagement with the same when said notch faces pass beyond engagement.

10. In a steering gear, a worm and a gear having conjugate tooth surfaces, all of said surfaces of the gear being such as might be simultaneously formed by a transverse rectilinear movement of a forming tool, said movement being non-parallel to the axis of the gear but in fixed angular relation thereto and said worm being such as might be generated by a single opposed pair of said tooth surfaces upon the simultaneous rotation of said worm and gear about their respective axes.

11. In a steering gear the combination with a rotary steering stem, and a rock shaft to be actuated thereby, of a gear mounted on said rock shaft having a plurality of teeth, a worm on the steering stem such as would be generated by a single pair of oppositely facing tooth surfaces at the center of said gear during the simultaneous rotation of said worm and gear about their respective axes, said gear having all of the other tooth surfaces thereof clearing the surfaces of the worm while said central pair are in engagement with the worm.

In testimony whereof I affix my signature.

WALLACE N. OSBURN.